US011770274B1

(12) United States Patent
Liu et al.

(10) Patent No.: US 11,770,274 B1
(45) Date of Patent: Sep. 26, 2023

(54) RECEIVER WITH HALF-RATE SAMPLER CIRCUITS

(71) Applicant: Apple Inc., Cupertino, CA (US)

(72) Inventors: Wing Liu, Milpitas, CA (US); Sanjeev K. Maheshwari, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/664,747

(22) Filed: May 24, 2022

(51) Int. Cl.
*H04L 25/03* (2006.01)

(52) U.S. Cl.
CPC .............................. *H04L 25/03057* (2013.01)

(58) Field of Classification Search
CPC ......... H04L 25/03006; H04L 25/03057; H04L 25/0328; H04L 25/03885; H04L 25/03949; H04L 2025/03433; H04L 2025/0356
USPC ......... 375/232, 233, 348, 350; 708/322, 323
See application file for complete search history.

(56) References Cited

U.S. PATENT DOCUMENTS

| 7,339,989 | B1 * | 3/2008 | McAdam | H04L 25/067 375/232 |
| 7,397,848 | B2 | 7/2008 | Stojanovic et al. | |
| 9,350,572 | B1 * | 5/2016 | Kang | H04L 7/033 |
| 9,444,437 | B2 | 9/2016 | Bulzacchelli et al. | |
| 9,929,883 | B2 | 3/2018 | Chen | |
| 10,693,473 | B2 | 6/2020 | Tajalli et al. | |
| 2013/0214865 | A1 * | 8/2013 | Bulzacchelli | H03K 19/018528 330/261 |
| 2013/0257483 | A1 * | 10/2013 | Bulzacchelli | H03K 3/356139 327/52 |
| 2016/0241421 | A1 * | 8/2016 | Lim | H04L 25/0272 |
| 2017/0295039 | A1 * | 10/2017 | Hidaka | H04L 25/03267 |
| 2019/0273639 | A1 * | 9/2019 | Jose | H04L 25/0272 |
| 2020/0322189 | A1 * | 10/2020 | Hormati | H04L 25/03146 |

FOREIGN PATENT DOCUMENTS

KR           1802791 B1 * 11/2017  ....... H04L 25/03267

* cited by examiner

*Primary Examiner* — Young T. Tse
(74) *Attorney, Agent, or Firm* — Kowert, Hood, Munyon, Rankin & Goetzel, P.C.; Erik A. Heter; Dean M. Munyon

(57) ABSTRACT

A decision feedback equalizer (DFE) sampler circuit is disclosed. The DFE sampler includes a front-end circuit configured to generate a filtered signal using a plurality of signals that encode a serial data stream that includes a plurality of data symbols and a summing circuit configured to generate an equalized signal by combining the filtered signal and an analog feedback signal based on a digital feedback signal. The DFE sampler further includes first and second samplers configured to sample the equalized signal and generate first and second regeneration signals, respectively, during first and second time periods. A compensation circuit is configured to generate the digital feedback signal using the first and second regeneration signals. The first and second samplers, in alternating time periods, cancel ISI from the equalized signal using the first and second regeneration signals, respectively.

20 Claims, 11 Drawing Sheets

RECEIVER WITH HALF-RATE SAMPLER CIRCUITS

BACKGROUND

Technical Field

The present disclosure is directed to communications circuits, and more particularly, to decision feedback equalization (DFE) circuits.

Description of the Related Art

Inter-symbol interference (ISI) occurs in high speed communications channels when a received symbol interferes with subsequently received symbols. For example, receiving a symbol as a logic 1 can cause distortion that results in difficulty interpreting a next symbol received as a logic 0.

As a mechanism for dealing with ISI, various techniques of decision feedback equalization (DFE) have been developed. In a receiver using DFE, compensation is applied to a next symbol to be received based on a value of the currently received symbol. For example, when a logic 1 is received, a threshold voltage for interpreting the logic value of the next symbol to be received may be adjusted to allow for more accurate interpretation. In the case of a presently logic 1, this can include increasing the threshold voltage for the next symbol. Thus, if the current symbol is a logic 1 and next symbol is a logic 1, the voltage of the next symbol is likely to exceed the upwardly adjusted threshold. However, if the next symbol is a logic 0 (a change from the most recently received symbol of a logic 1), the upwardly adjusted threshold provides a greater voltage margin for correct interpretation of the symbol's logic value.

SUMMARY

A decision feedback equalizer (DFE) sampler circuit is disclosed. In one embodiment, the DFE sampler includes a front-end circuit configured to generate a filtered signal using a plurality of signals that encode a serial data stream that includes a plurality of data symbols and a summing circuit configured to generate an equalized signal by combining the filtered signal and an analog feedback signal that is based on a digital feedback signal. The DFE sampler further includes first and second samplers configured to sample the equalized signal and generate first and second regeneration signals, respectively, during first and second time periods. A compensation circuit is configured to generate the digital feedback signal using the first and second regeneration signals. During the first time period, the first sampler cancels a first inter-symbol interference (ISI) in the equalized signal using the second regeneration signal. During the second time period, the second time period, the second sampler cancels a second ISI in the equalized signal using the first regeneration signal.

In one embodiment, the DFE sampler includes a plurality of sense amplifier circuits distributed among the first and second samplers. This includes, in each of the first and second samplers, a most significant bit (MSB) sense amplifier and a least significant bit (LSB) sense amplifier of the first sampler circuit and a second MSB sense amplifier and a second LSB sense amplifier of the second sense amplifier circuit. Each of the plurality of sense amplifiers a first amplifier circuit configured to generate a first compensation signal for a present data symbol and a second amplifier circuit configured to generate a second compensation signal for the present data symbol, Each of the sense amplifiers also includes a threshold generation circuit coupled to receive the present data symbol and configured generate a threshold voltage based on the first compensation signal and the second compensation signal. A regeneration circuit in each of the sense amplifiers configured to capture and store a logic value for the present data symbol based on the threshold voltage, and further configured to generate a corresponding portion of one of the first and second regeneration signals.

BRIEF DESCRIPTION OF THE DRAWINGS

The following detailed description makes reference to the accompanying drawings, which are now briefly described.

DETAILED DESCRIPTION OF EMBODIMENTS

Figure 1:
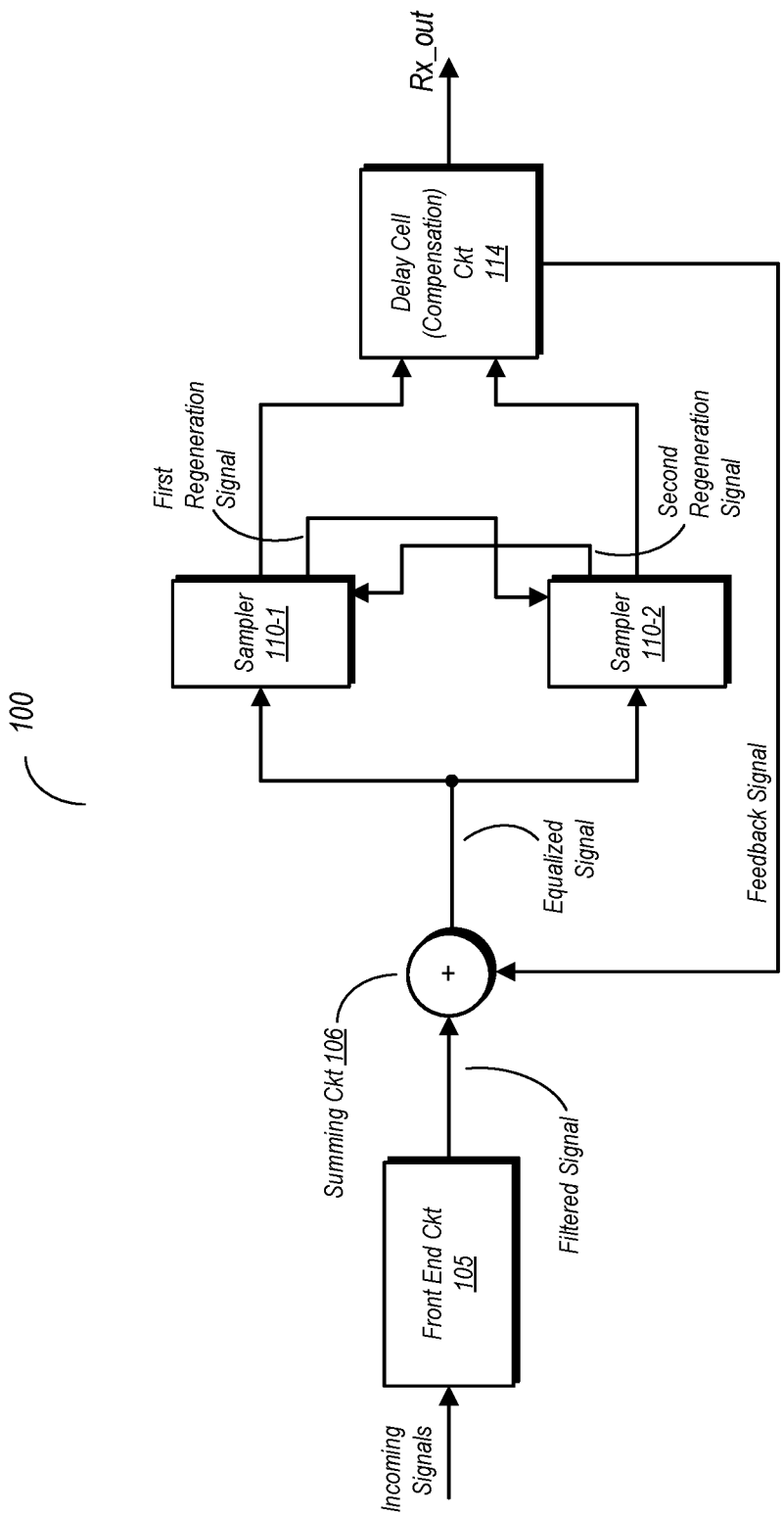
FIG. 1 is a block diagram of one embodiment of a receiver used in a communications system.

The present disclosure is directed a receiver using decision feedback equalization (DFE) sampler circuits. Inter-symbol interference (ISI) is a known problem in digital communications systems. ISI is a distortion induced by a present symbol that interferes with subsequent symbols. To alleviate problems of ISI, decision feedback equalization (DFE) is used. DFE uses previous symbols to account for distortion in the current symbol in order to interpret the current symbol at a correct value, e.g., by setting a threshold voltage used to distinguish one value from another. The configuration of the DFE structure in a receiver may depend on the type of sampler circuit used, which in turn may depend on the type of signaling, e.g., PAM3 (a ternary signaling method) or NRZ (a binary signaling method).

The present disclosure is directed to a receiver structure and a sampler circuit used therein to provide DFE for incoming data symbols. The receiver includes first and second samplers that sample an incoming signal during alternating time periods. The first and second samplers generate first and second regeneration signals, respectively. The first sampler cancels a first inter-symbol interference using the second regeneration signal, while the second sampler cancels a second inter-symbol interference using the first regeneration signal.

Each of the first and second samplers includes a plurality of sense amplifier circuits that generate samples of the incoming signal. The sense amplifier circuits includes a number of differential pairs. A first differential pair is configured to use DFE to compensate the incoming signal when a most significant bit (MSB) is larger than a high threshold, while a second differential pair is used compensate the incoming signal when a least significant bit (LSB) is less than a low threshold. A third differential pair is used to receive the compensation signals and the incoming data symbol, and, using these signals, determines the value of the data symbol. A regeneration signal is configured to capture and hold the value of the data symbol until the next cycle of evaluation is performed.

The sense amplifier circuits, and thus the receiver, may be operated in different modes. For example, one embodiment is contemplated in which the receiver is configured for operating in a first mode using PAM3 (Pulse amplitude modulation, 3 levels) signaling or in a second mode that utilizes NRZ (non-return to zero) mode signaling. The present disclosure also contemplates a calibration methodology for the sense amplifier circuits.

The discussion below begins with respective descriptions various embodiments of a receiver in accordance with this disclosure. Thereafter, a sense amplifier circuit and operation thereof is discussed. A description of a calibration method for one embodiment of a sense amplifier and an example communications system follow. A method for operating a receiver circuit is also described, followed by an example system in which the receiver may be utilized.

Receiver with Half-Rate DFE Samplers

Turning now to FIG. 1, a block diagram of one embodiment of a receiver circuit is shown. In the embodiment shown, receiver circuit 100 includes a front end circuit 105, which may be a continuous time linear equalizer (CTLE) configured to receive incoming signals in accordance with a communications protocol. Possible protocols include PAM3 and NRZ, although embodiments configured for other types of protocols and signaling are possible and contemplated. Receiver circuit 100 also includes a summing circuit 106, samplers 110-1 and 110-2, and a delay cell circuit 114, which may also be referred to as a compensation circuit.

Front end circuit 105 in the embodiment shown includes one or more filters, and is configured to output a filtered signal. The filtered signal is received by summing circuit 106, and combined with a feedback signal received from delay cell circuit 114. The result of combining the filtered signal and the feedback signal is an equalized signal that is provided to samplers 110-1 and 110-2. The signal path to samplers 110-1 and 110-2 is divided into two different paths, which may be referred to as even and odd paths.

Samplers 110-1 and 110-2 operate in alternating fashion. Sampler 110-1 in the embodiment shown samples the equalized signal to receive a symbol during a first cycle, while sampler 110-2 samples the equalized signal to receive a second symbol during a second cycle subsequent to the first. When a given one of the samplers 110-1 and 110-2 samples the equalized signal to receive a symbol, it also provides a corresponding regeneration signal to the opposite sampler. The regeneration signals generated by samplers 110-1 and 110-2 are based on the values of the symbols received in the sampled equalized signal. Each of samplers 110-1 and 110-2 uses the regeneration signal received from the opposite sampler to perform decision feedback equalization (DFE) on its current sample. Accordingly, during a first time period, or first cycle, sampler 110-1 cancels first inter-symbol-interference in the equalized signal using the second regeneration signal. Similarly, during a second time period, or second cycle, sampler 110-2 cancels second inter-symbol-interference in the equalized signal using the first regeneration signal. Both the first and second regeneration signals are based on the value of the current symbol received in by their respective samplers 110-1 and 110-2.

In addition to providing the regenerations signals, both samplers 110-1 and 110-2 provide their respective data output signals to delay cell circuit 114. Among other functions, delay cell circuit 114 generates the feedback signal that is provided to summing circuit 106. In some embodiments, the feedback signal is generated as a digital signal and is converted into an analog signal prior being provided to summing circuit 106.

Figure 2:
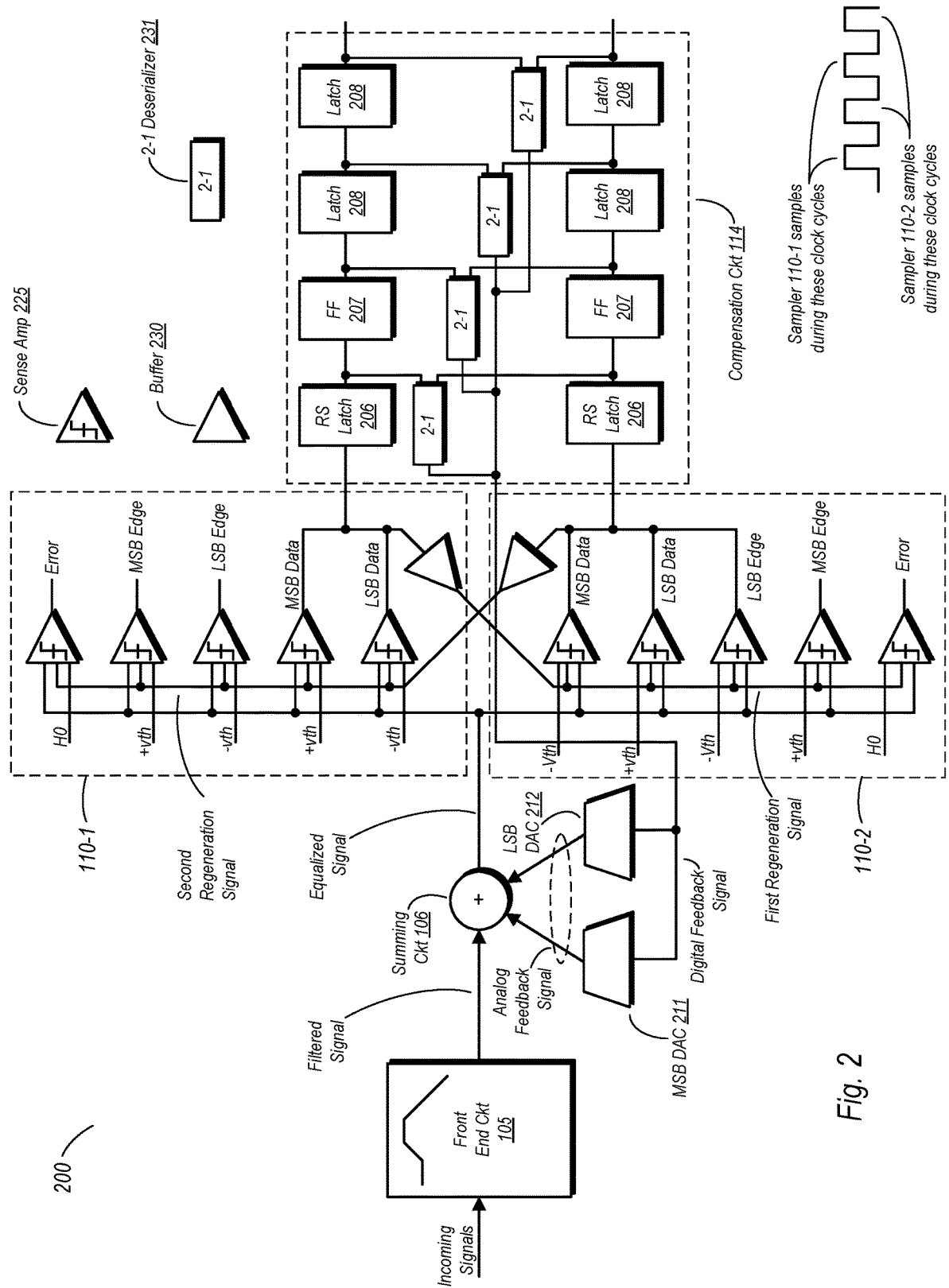
FIG. 2 is a diagram illustrating further details of one embodiment of a receiver.

FIG. 2 is a diagram that illustrates further details of one embodiment of a receiver circuit. In the embodiment shown, front end circuit 105 is arranged to receive an incoming signal and is configured to output a filtered signal, similar to that of the embodiment discussed above in reference to FIG. 1. The filtered signals is provided to a summing 106, which is further configured to receive LSB and MSB components of an analog feedback signal. The components of the analog feedback signal is generated, based on a digital feedback signal, by MSB digital-to-analog converter (DAC) 211 and LSB DAC 212. These components of the analog feedback signal are combined in summing circuit 106 with the filtered signal output from front end circuit 105 to generate the equalized signal that is then provided to the samplers 110-1.

Samplers 110-1 and 110-2 in the embodiment shown each include a number of sense amplifiers 225. In the embodiment shown, each of samplers 110-1 and 110-2 include MSB and LSB data sense amplifiers, edge sense amplifiers for both the LSB and MSB, and an error sense amplifier. The edge sense amplifiers may be used to detect an edge of the incoming data signal, and their outputs may be used in a clock and data recovery circuit (not shown here) to align a sampling clock with incoming data. The error sense amplifier may be used to detect if the incoming signal from the front end circuit 105 is over- or under-equalized. The output of these amplifiers, along with the data outputs may be used in the DFE adaptation loop to adjust DFE coefficients. When operating in a first mode (e.g., PAM3 mode, a ternary signal), the respective regeneration signals provided by the samplers 110-1 and 110-2 are provided, via a corresponding buffer 230, to sense amplifier inputs of the opposite sampler (e.g., the sense amplifiers of sampler 110-1 receive the second regeneration signal that is provided from sampler 110-2, and vice versa). As can be seen here, the regeneration signals are generated based on data samples from various ones of the sense amplifiers in the corresponding sampler 110-1/110-2.

Each of the sense amplifiers 225 in the embodiment shown include a plurality of inputs. These inputs include the equalized signal received from summing circuit, as well as a regeneration signal from the opposite one of samplers. Threshold voltages (+vth, −vth, H0) are also provided as inputs, with these voltage being generated by DACs that are not shown here. In one embodiment, these DACs are implemented as resistor ladder DACs which divides a supply voltage into a series of small delta voltages that are substantially equivalent to an LSB voltage. The sense amplifiers each included an input for a clock signal that is not shown here but is shown in figures discussed below that illustrate an embodiment of a sense amplifier.

When operating in a second mode (e.g., NRZ, a binary signal) the MSB sense amplifiers are turned off and their respective outputs are forced to zero.

The outputs of the data sense amplifiers (MSB and LSB) of both samplers 110-1 and 110-2, along with the output of the LSB edge sense amplifier from sampler 110-2, are provided on corresponding paths to delay cell circuit 114. Delay cell circuit 114 includes two different paths each having a number of serially coupled storage elements (RS latch 206, flip-flop 207, and latches 208). The storage elements may each be coupled to receive the same clock signal as provided to the sense amplifiers. The output of each of these storage elements is a 2-1 deserializer circuit that is coupled to both paths. The outputs of the deserializers are combined on a single bus to form the digital feedback signal. The digital feedback signal thus includes a history of the most recently received symbols. The digital feedback signal thus applies this history to the MSB DAC 211 and LSB DAC 212 in order to generate respective components of the analog feedback signal that is applied to summing circuit 106. Accordingly, the history of previous symbols is used in equalizing the filtered signal, and forms part of the basis for the DFE carried out in receiver circuit 200.

As noted above, samplers 110-1 and 110-2 operate in alternating fashion. In one embodiment, each of the samplers 110-1 and 110-2 samples the equalized signal at half the clock rate during alternating clock cycles. Accordingly, samplers 110-1 samples the equalized signal during a first clock signal, using the second regeneration signal, to generate corresponding MSB and LSB data that is provided to delay cell circuit 114 and is additionally provided to other circuitry (not shown) for post processing of the received symbols. Additionally, during the first clock cycle, sampler 110-1 generates the first regeneration signal, which is applied to second sampler 110-2. During the next clock cycle, samplers 110-2 samples the equalized signal to generate corresponding MSB and LSB data, and also generates the second regeneration signal that is provided to sampler 110-1 for use in the following clock cycle.

Accordingly, each of the samplers in the embodiment shown sample the equalized signal at half the rate of the clock signal, and use the value of the most recent sample by the other sampler circuit (in the form of a regeneration signal) as an input during their respective sampling cycles. The use of the regeneration signal, along with the equalization of the filtered signal by combining it with a feedback signal may cancel a significant amount of inter-symbol interference.

Sense Amplifier Circuit for Use in Sampler

Figure 3:
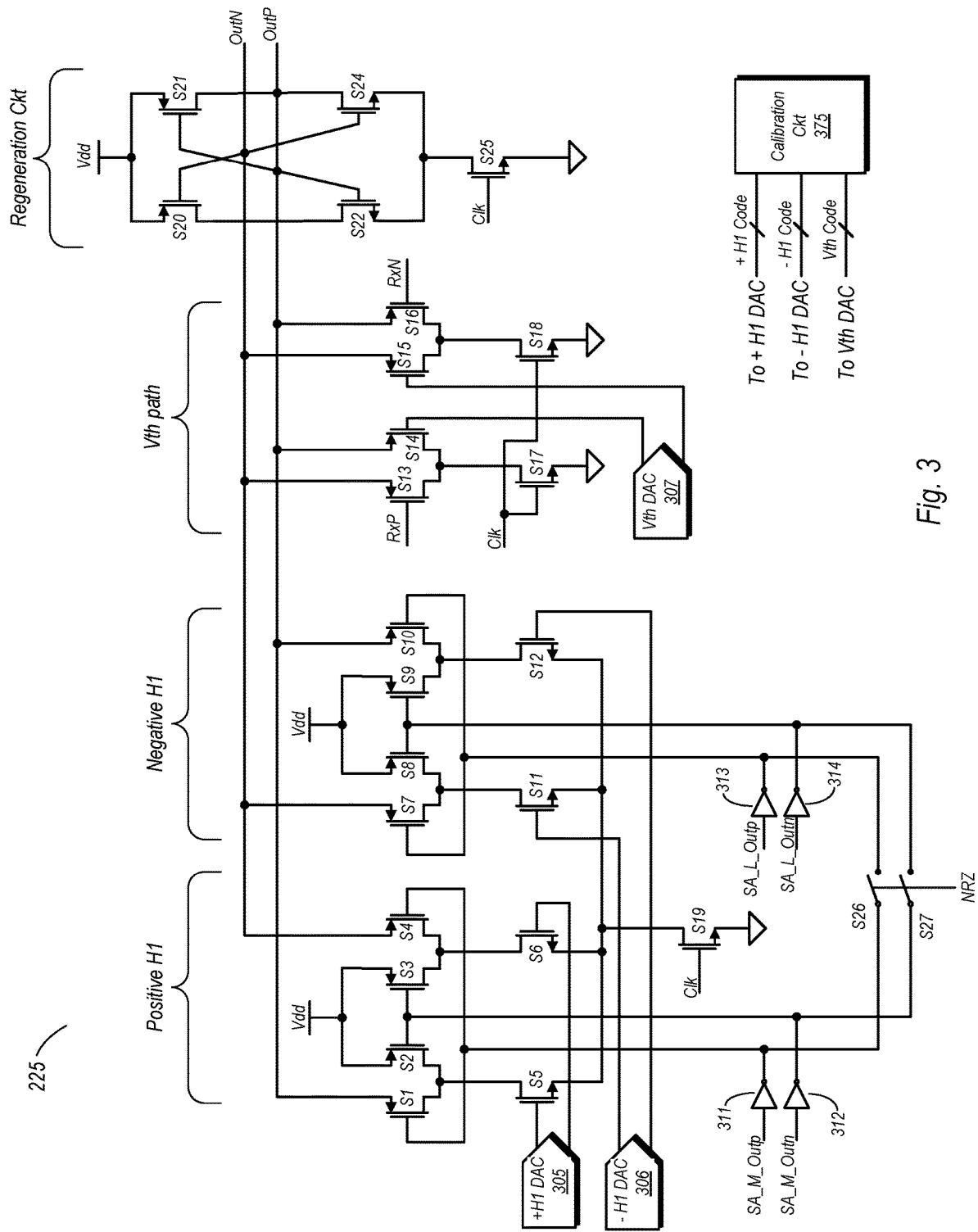
FIG. 3 is a schematic diagram of one embodiment of a sense amplifier circuit used in one embodiment of a receiver.

FIG. 3 is a schematic diagram of one embodiment of a sense amplifier that may be used in the samplers of FIGS. 1 and 2. In the embodiment shown, sense amplifier 225 includes three differential pairs, under the labels of Positive H1, Negative H1, and Vth path. Additionally, sense amplifier 225 includes a regeneration circuit comprising a pair of cross-coupled inverter that captures a currently generate logic value from an input signal and holds that value when the clock signal is inactive.

The first differential pair in the embodiment shown includes a first differential amplifier including devices S1 and S2, and a second differential amplifier including devices S3 and S4. Devices S5 and S6 in the embodiment shown are used to set respective bias currents for the first and second differential amplifiers. These bias current are provides by +H1 DAC 305, which is configured to receive a digital word corresponding to the desired bias currents. Gate terminals of S1 and S4 are coupled to receive a signal from inverter 311, which is based on a true component of a regeneration signal, labeled here as SA_M_Outp. Gate terminals of S2 and S3 are coupled to receive a signal based on a complementary component of a regeneration signal, labeled here as SA_M_Outn.

The second differential pair includes a third differential amplifier including the devices S7 and S8, while a fourth differential amplifier includes devices S9 and S10. Devices S11 and S12 are used to set respective bias currents for the third and fourth differential amplifiers, based on a digital word provided to −H1 DAC 306. Each of the bias current devices (S5, S6, S11, and S12) in the embodiment shown includes a respective source terminal coupled to a drain terminal of device S19, which is activated when a clock signal (Clk) is in its respective active phase.

The third pair of differential amplifiers includes a fifth differential amplifier that includes devices S13 and S14, and a sixth differential amplifier including devices S15 and S16. Device S13 is coupled to receive a true component, RxP of the equalized signal, while device S16 is coupled to receive the complementary component, RxN, of the equalized signal. Vth DAC 307 is coupled to provide a threshold voltage to the respective gate terminals of devices S14 and S15. Devices S17 and S18 are controlled by the clock signal, and provide, when active, a current path for the fifth and sixth differential amplifiers.

Each of the differential amplifiers includes one device having a source terminal coupled to the OutP node, and another source terminal coupled to the OutN node. The positive and negative H1 pairs operate to cancel ISI from the currently received data symbol, while the Vth path differential amplifiers act as a slicer to determine the value of the current symbol.

When operating in the PAM3 mode, the differential amplifiers of the Vth path compare the received signal (RxP, RxN) with the threshold voltage output by Vth DAC 307 to slice the received signal into digital values. In the Positive H1 path, S5 and S6 are activated, when the received clock signal is active, by +H1 DAC 305 to set a first DFE tap coefficient. Devices S1-S4 are controlled by the SA_M_OutP and SA_M_Outn signals input to inverters 311 and 312, which is the regeneration signal from the opposite sampler that is based on the MSB of the previous symbol. If the PAM3 MSB data is larger than a corresponding MSB threshold voltage, current through S5 and S6 through the circuit and subtracts from the received signal. Otherwise, if the PAM3 MSB data is less than the corresponding MSB threshold, current is sunk to Vdd via S2 and S3. The Negative H1 path works on a similar principle, but is based on the LSB data of the previous symbol, as indicated by SA_L_Outp and SA_L_Outn. When the previous LSB data is less than a corresponding LSB threshold voltage, current through devices S11 and S12 is added to the received signal. Otherwise, current through S11 and S12 is sunk to Vdd. In the case where the voltage of the current signal is less than the MSB threshold and greater than the LSB threshold, the differential amplifiers in both the Positive H1 and Negative H1 portions of sense amplifier 225 sink current to Vdd, and no compensation is provided.

If operating in the NRZ mode, which is a binary, switches S26 and S27 are closed. Furthermore, inverters 311 and 312 are place in a high impedance mode. Accordingly, the regeneration signal is based on the LSB portion of the samplers, and in this embodiments of sense amplifier 225, provided via inverters 313 and 314.

Figure 4:
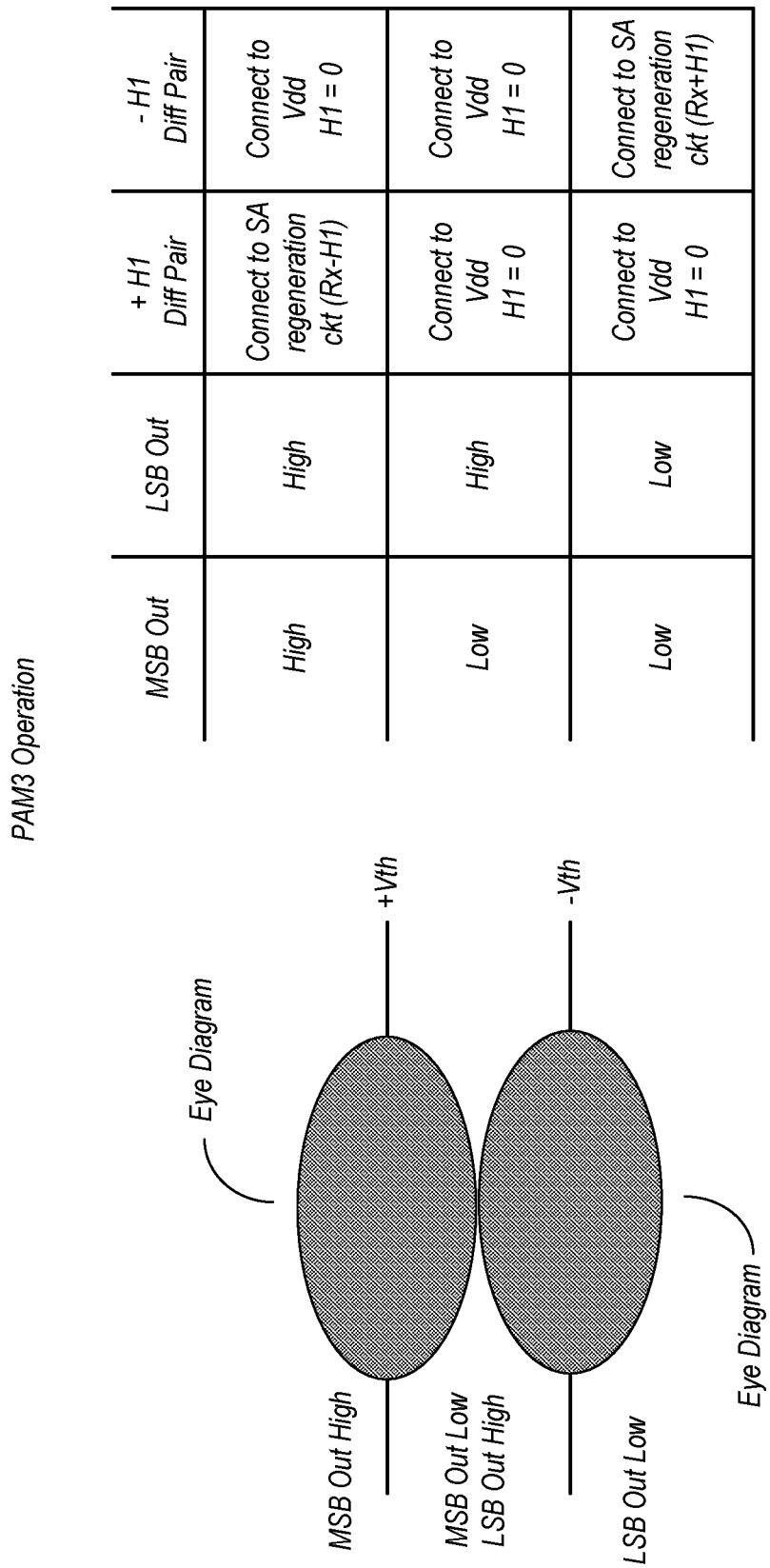
FIG. 4 is a diagram that illustrates certain aspects of operation for one embodiment of a sense amplifier used in a sampler circuit.

FIG. 4 is a diagram that illustrates certain aspects of operation for one embodiment of a sense amplifier used in a sampler circuit. In particular, FIG. 4 illustrates operation of the sense amplifier of FIG. 3 when in a PAM3 mode in which a received symbol can have one of three different levels. The signal levels MSB Out and LSB Out in the table of FIG. 4 are representative of the most recently received data symbol, as received via the regeneration signal discussed above in reference to FIGS. 1-3. Moreover, MSB Out in FIG. 4 corresponds to SA_M_Outp and SA_M_Outn signals of FIG. 3, which is the regeneration signal received from the sampler circuit opposite the one in which the particular sense amplifier is implemented. Based on the level of the regeneration signal, the sense amplifier provides compensation to cancel ISI.

When the regeneration signal is received with the previous value of the MSB Out being high (e.g. with a voltage level greater than +Vth), the differential pair coupled to the +H1 DAC (referred to here as the +H1 pair, or Positive H1 in FIG. 3) is connected to the sense amplifier regeneration circuit at both the OutP and OutN nodes. Thus, current through devices S5 and S6 flows through S1 and S4, respectively, and thus subtracts current, on the OutP and OutN nodes, from the currently received signal in the Vth path. It is noted that, by default in this embodiment, a high MSB Out signal results in the LSB Out signal also being high. When the LSB Out signal is high, the differential pair in −H1 (Negative H1) path is connected to sink current to Vdd, and thus does not affect the OutP and OutN nodes.

When the MSB Out signal is low and the LSB out signal is high, both differential pairs in each of the +H1 and −H1 paths are connected to source current to Vdd. This state corresponds to a received signal voltage that is less than the threshold voltage +Vth but greater than the threshold voltage −Vth. In this case, no compensation is provided on the OutP and OutN nodes, and thus the state of the received signal is determined solely by the differential amplifier pair in the Vth path.

When both the MSB Out and LSB out signals are low, the current through S11 and S12 is provided to compensate the received signal via S7 and S10, respectively. This state corresponds to a voltage of the signal being less than the −Vth threshold, with compensation being provided from the Negative H1 path. When compensation is provided in this case, current is added to the OutP and OutN nodes. Meanwhile, the differential pair in the Positive H1 path sources current to Vdd in this particular case.

Sense Amplifier Calibration

Figure 5A:
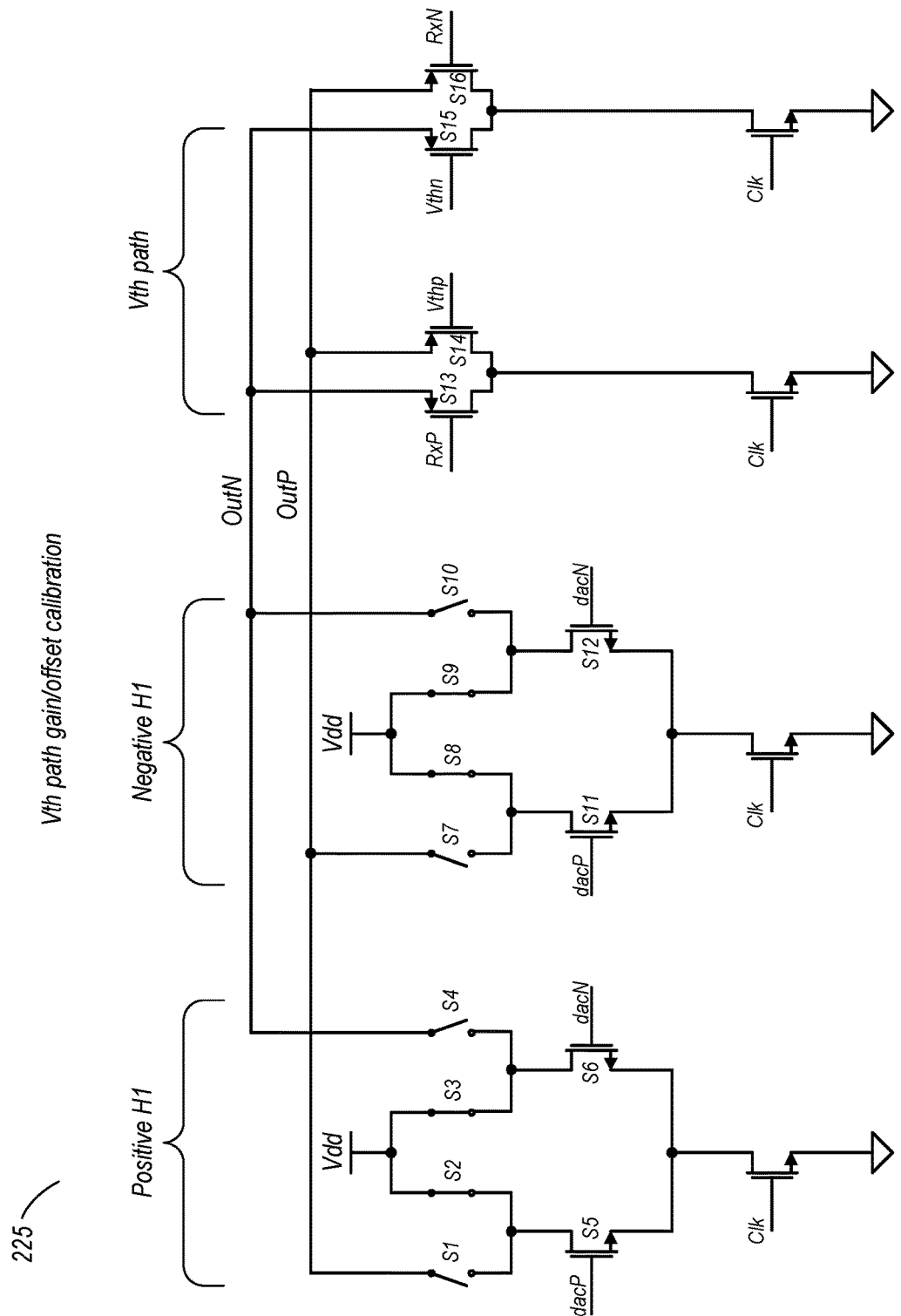
FIG. 5A is a schematic diagram illustrating an arrangement of one embodiment of a sampler circuit during a calibration routine.
Figure 5B:
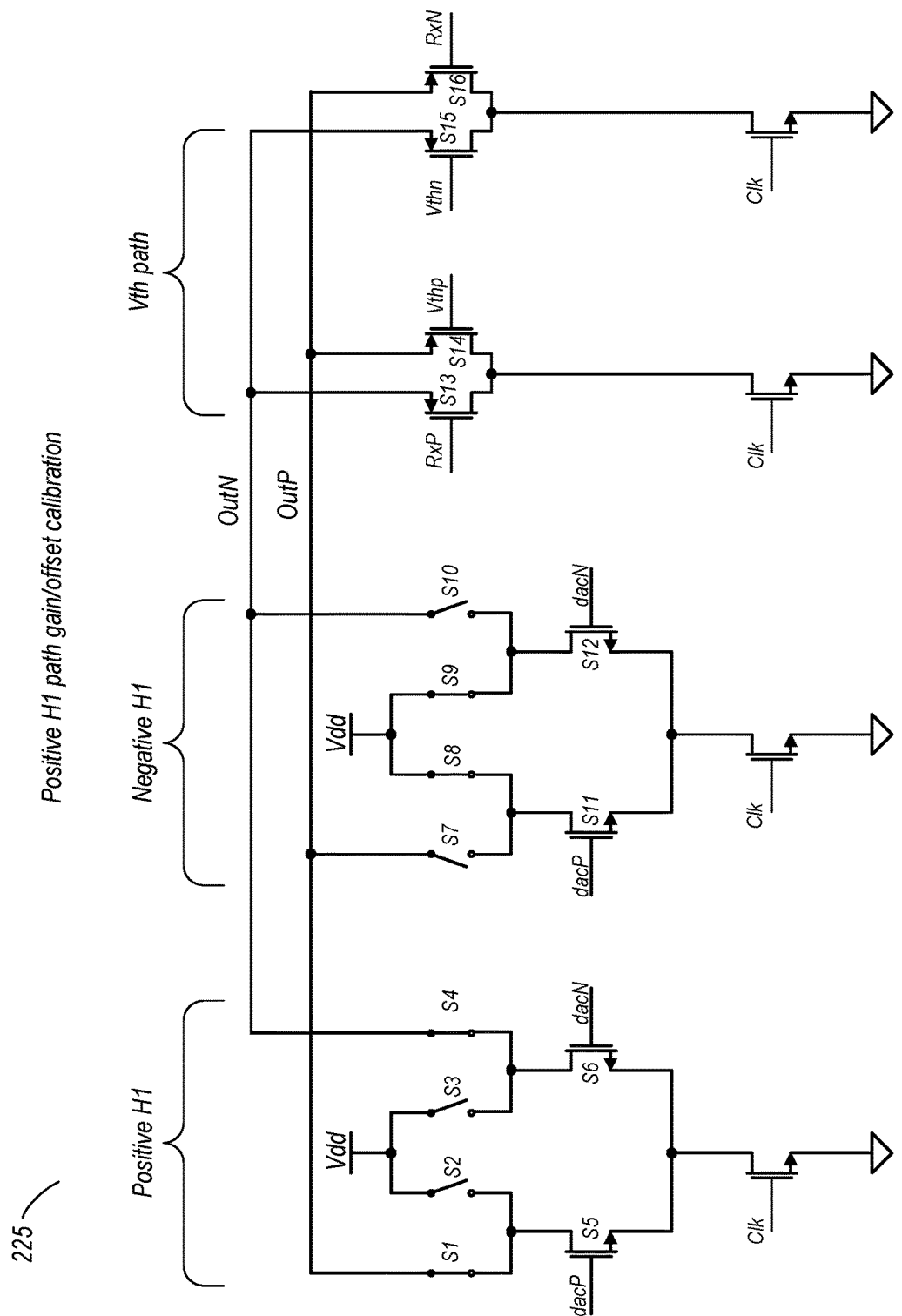
FIG. 5B is a schematic diagram illustrating an arrangement of one embodiment of a sampler circuit during a calibration routine.
Figure 5C:
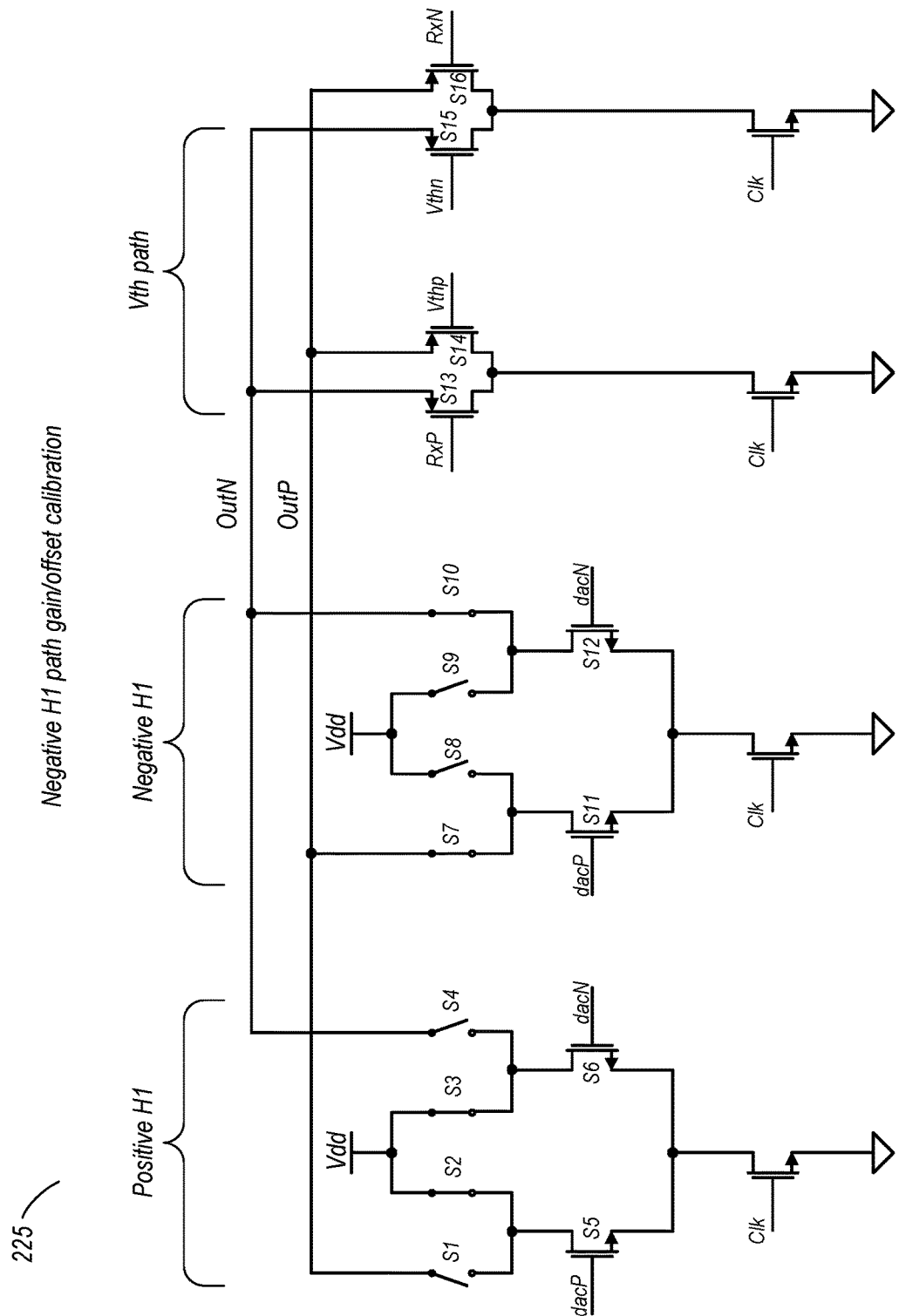
FIG. 5C is a schematic diagram illustrating an arrangement of one embodiment of a sampler circuit during a calibration routine.
Figure 5D:
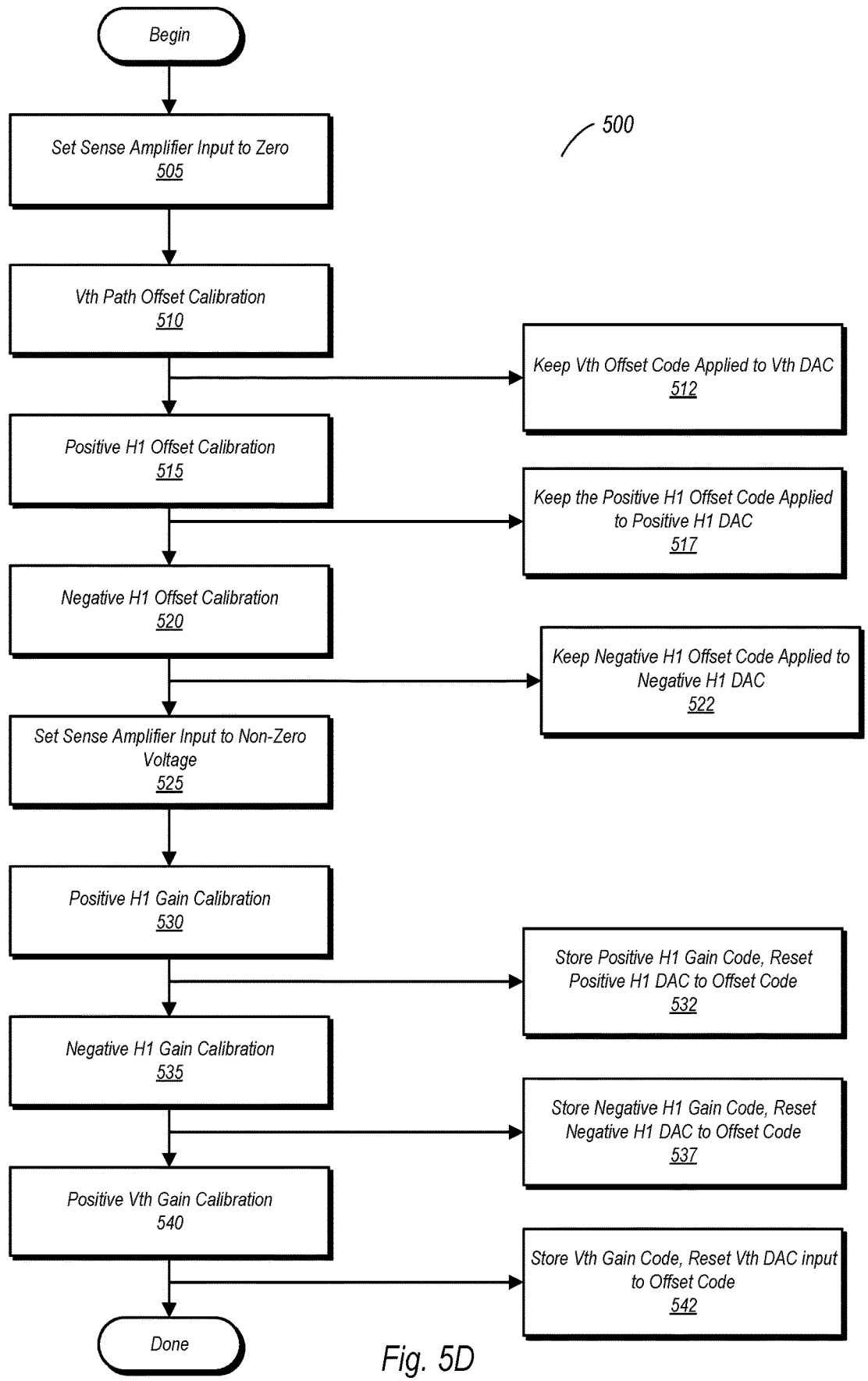
FIG. 5D is a flow diagram illustrating one embodiment of a method for calibrating a sense amplifier.

In a given instance of sense amplifier 225, each pair of differential amplifiers has an offset and a gain mismatch relative to the other sense amplifiers in the sampler circuits. These differential pair mismatches may be calibrated separately and independently of the other two pairs by turning on one pair at a time. FIGS. 5A-5C illustrate circuit configurations for calibrating the differential pairs of a given sense amplifier, while FIG. 5D is directed to a method for calibrating the sense amplifier.

FIG. 5A illustrates a circuit configuration for calibrating the Vth path in an embodiment of sense amplifier 225. In this configuration, the differential pair in the Positive H1 path is arranged to sink current to Vdd by deactivation of S1 and S4 while activating S2 and S3. Similarly, the differential pair in the Negative H1 path is also arranged to sink current to Vdd by deactivating S7 and S10 while S8 and S9 are active.

FIG. 5B illustrates the configuration for performing the positive H1 calibration of the embodiment of sense amplifier 225 disclosed herein. In this configuration, switches S1 and S4 are closed, thereby providing a current path from OutP through S5 and another current path from OutN through S6. Switches S7 and S10 are open at this time, while switches S8 and S9 are closed. Accordingly, in the Negative H1 path, current is sunk to Vdd.

The configuration for performing the Negative H1 calibration is shown in FIG. 5C. In this configuration, the closing of S7 provides a current path from OutP through S11. S10 is also close, providing a current path from OutN through S12. Switches S8 and S9 are open. In the Positive H1 path, switches S1 and S4 are open, while switches S2 and S3 are closed to allow current to be sunk to Vdd.

The calibrations discussed herein may be carried out by applying different codes (from calibration circuit 375) to the DACs coupled to sense amplifier 225 as well as different signal values to the RxP and RxN inputs in the Vth path. In one embodiment, the calibrations are carried out in accordance with Method 500 illustrated in FIG. 5D.

Method 500 begins with setting the sense amplifier input signal to zero (block 505) on the RxP and RxN inputs in the Vth path. Thereafter, the circuit is placed in the configuration of FIG. 5A, and a Vth calibration is performed (block 510) by sweeping values of the Vth DAC (which feeds the gate terminals of S14 and S15) until the circuit toggles. The code provided to the Vth DAC at the point of tolling is then saves as an offset code (block 512).

Method 500 continues with carrying out of the Positive H1 offset calibration (block 515), which may be carried out in a manner similar to the Vth calibration, with a sweeping of the positive H1 DAC code. The positive H1 Offset code that was applied to the Positive H1 DAC is then kept and stored (block 517). The Negative H1 offset calibration is also performed (block 520), in a manner similar to that of the positive H1 DAC code, sweeping, in this case, the negative H1 DAC code, with the Negative H1 offset code that was applied to the Negative H1 DAC being saved (block 522).

After completing the offset calibrations, the sense amplifier input is set to zero (block 525). A Positive H1 gain calibration is then carried out (block 530), with the Positive H1 gain code being stored and the positive H1 DAC being reset its calibrated offset code (block 532). The Negative H1 gain calibration follows (block 535), with the Negative H1 gain code being stored and the Negative H1 DAC being reset to its corresponding offset code (block 537). The Positive Vth gain calibration is also performed (block 540), with the Vth gain code being stored and the Vth DAC input being reset to its corresponding offset code (block 542).

The various calibrations described above may be carried out as needed, e.g., at a system startup, after waking from a sleep mode, or periodically, as desired. After the gain and offset DAC codes are found for each differential pairs in each of the samplers, the data/edge sampler threshold voltage can be calculated from the error sampler's Vth. The calibrated threshold voltage may be calculated by the following equation:

$$Vth_{cal} = \frac{(Vth_{err} - O_r) \times (G_c - O_c)}{(G_r - O_r)} + O_c,$$

where $O_r$ is the error sampler offset from block 510, $G_r$ is the error sampler gain mismatch from block 540, $O_c$ is data/edge sampler offset from block 510, $G_c$ is the data/edge sampler gain mismatch from block 540, and $Vth_{err}$ is the error sampler Vth.

It is noted that while the circuits discussed above have been implemented using NMOS and PMOS transistors, the disclosure is not intended to limit embodiments falling within its scope to these types of devices. Thus, in addition to various MOSFET types discussed above, the present disclosure also contemplates embodiments that use non-planar devices such as FinFETs, GAAFETs (Gate All Around FETs), among other types. Embodiments implemented using bipolar devices are also possible and contemplated. The disclosure further contemplates that technologies that are speculative as of this writing may be used to implement devices in various embodiments of the circuits discussed herein. These technologies include (but are not limited to) graphene transistors, carbon nanotube transistors, gallium arsenide transistors, and so on. The use of memristors in certain circuit structures is also contemplated.

Communications System

Figure 6:
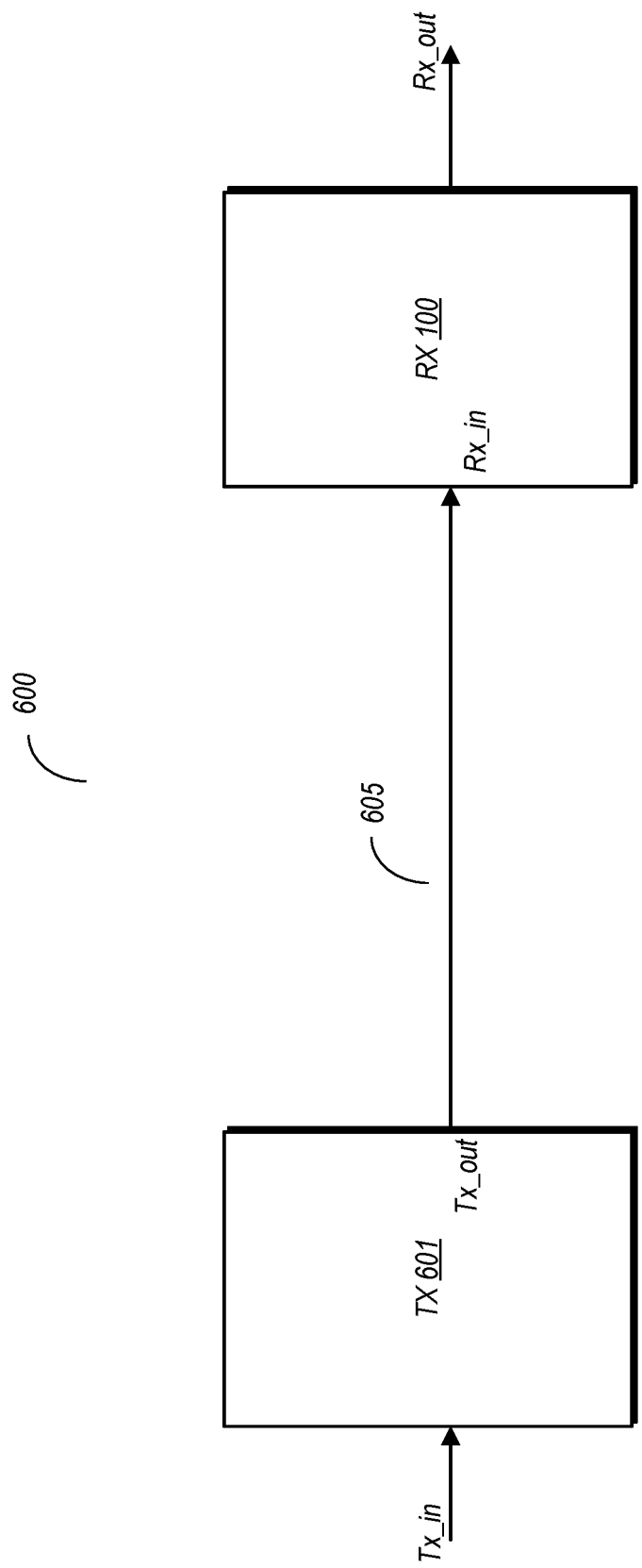
FIG. 6 is a block diagram of one embodiment of a communications system.

FIG. 6 is a block diagram of one embodiment of a communications system. In the embodiment shown, communications system 600 includes a transmitter 601 configured to convey signals to receiver 100 via communications channel 605. Transmitter 601 is coupled to receive information from another source via an input (Tx_in), and perform any necessary functions on the information to prepare for transmission. The information is then transmitted from an output (Tx_out) across communications channel 605 to receiver 100. In one embodiment, communications system 600 is a wired communications system, and may transmit information in serial or parallel.

Receiver 100 in the embodiment shown may include various embodiments of the hardware discussed in regard to FIGS. 1 and 2, and may further include sense amplifier discussed in regards to FIGS. 3-5D. Receiver 100 may also include additional circuitry. This may include circuitry arranged for initial receiving of the incoming transmissions via the Rx_in input, such as clock and data recovery (CDR) circuitry and so on. Additional circuitry beyond that which was discussed above may also include post-processing hardware configured to carry out various functions to arrange the received information in a useful form for other units coupled to the receiver output, Rx_out.

Method for Operating a Receiver Circuit

Figure 7:
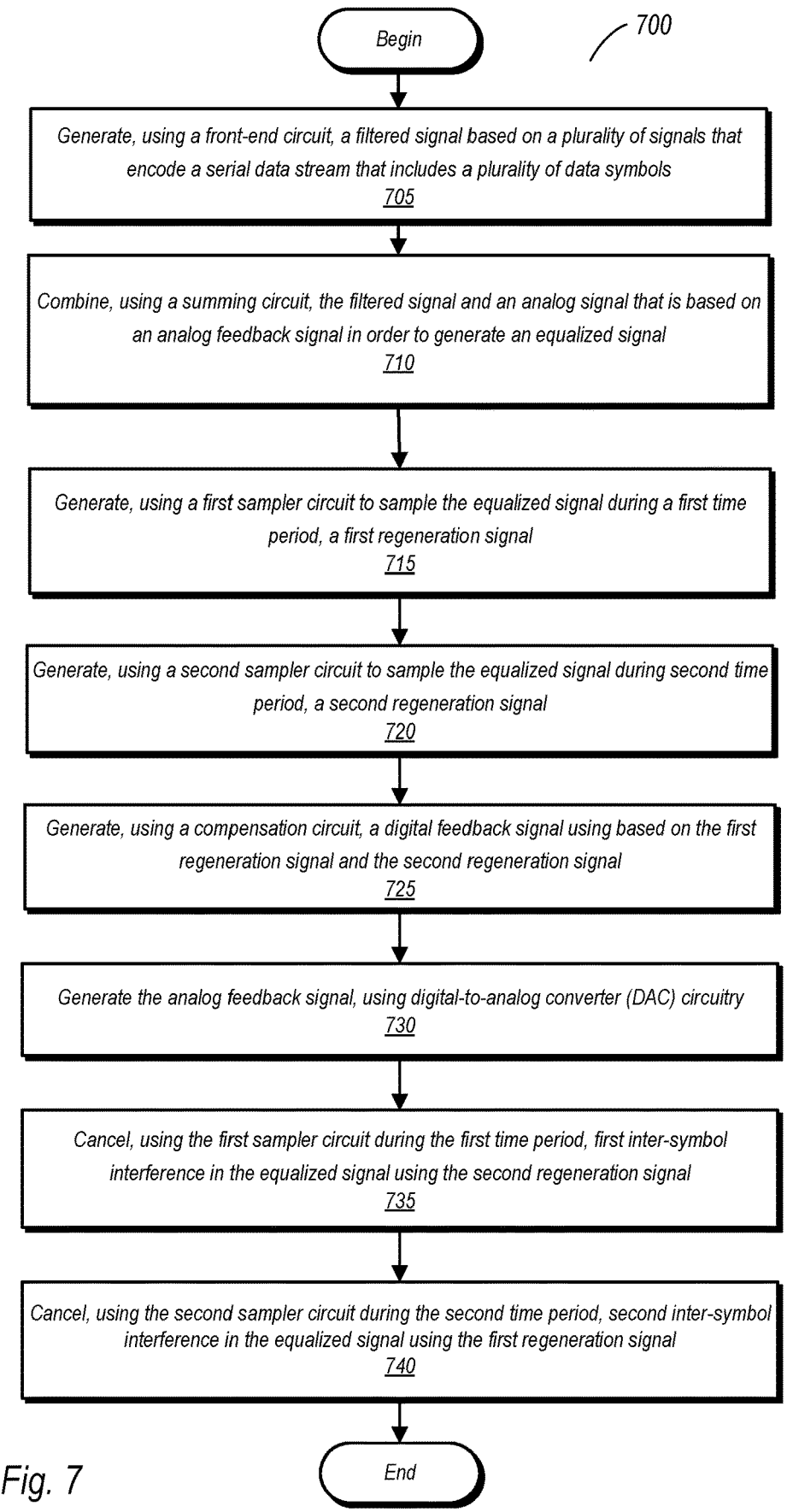
FIG. 7 is a block diagram of one embodiment of a method for operating a receiver in a communications system.

FIG. 7 is a flow diagram of one embodiment of a method for operating a receiver in a communications system. Method 700 may be carried out by various embodiments of the receiver and circuits disclosed herein. Embodiments of receivers/circuits capable of carrying out Method 700 but not otherwise disclosed herein are considered to fall within the scope of this disclosure.

Method 700 includes generating, using a front-end circuit, a filtered signal based on a plurality of signals that encode a serial data stream that includes a plurality of data symbols (block 705), and combining, using a summing circuit, the filtered signal and an analog signal that is based on an analog feedback signal in order to generate an equalized signal (block 710). The method further includes generating, using a first sampler circuit to sample the equalized signal during a first time period, a first regeneration signal (block 715) and generating, using a second sampler circuit to sample the equalized signal during second time period, a second regeneration signal (block 720). With regard to the feedback signals, Method 700 includes generating, using a compensation circuit, a digital feedback signal using based on the first regeneration signal and the second regeneration signal (block 725) and generating the analog feedback signal, using digital-to-analog converter (DAC) circuitry (block 730). The first and second sampler circuits are used to cancel inter-symbol interference. Accordingly, Method 700 canceling, using the first sampler circuit during the first time period, first inter-symbol interference in the equalized signal using the second regeneration signal (block 735) and canceling, using the second sampler circuit during the second time period, second inter-symbol interference in the equalized signal using the first regeneration signal (block 740).

In various embodiments, the method further includes generating the first and second regeneration signals in corresponding ones of a plurality of sense amplifier circuit including a first most significant bit (MSB) sense amplifier and a first least significant bit (LSB) sense amplifier of the first sampler circuit and a second MSB sense amplifier and a second LSB sense amplifier of the second sense amplifier circuit.

With regard to operating the sampler circuits, the method includes generating, in a first amplifier circuit, a first compensation signal for a present data symbol and generating, in a second amplifier circuit, a second compensation signal for the present data symbol. In operating the sampler circuits, the method also includes generating, in a threshold voltage circuit, a threshold voltage based on the first and second compensation signals and capturing and storing, in a regeneration circuit and based on the threshold voltage, a logic value for the present data symbol.

From time to time, the sampler circuits may be calibrated. Accordingly, embodiments of the method are contemplated that include performing a first calibration procedure to calibrate the first amplifier circuit, performing a second calibration procedure to calibrate the second amplifier circuit, and performing a third calibration procedure to calibrate the threshold voltage circuit.

The receiver circuits as disclosed herein may be operated in different modes. Accordingly, an embodiment of method includes operating ones of the plurality of sense amplifiers in a first mode in which received data symbols are ternary data symbols. A method is also contemplated that includes operating ones of the plurality of sense amplifiers in a second mode in which the received data symbols are binary data symbols.

In various embodiments, the method also includes alternating sampling of the equalized signal between the first and second sampler circuits over a plurality of consecutive time periods. This may be used as a basis for generating the signals used for cancellation of the inter-symbol interference, as discussed above.

Example System

Figure 8:
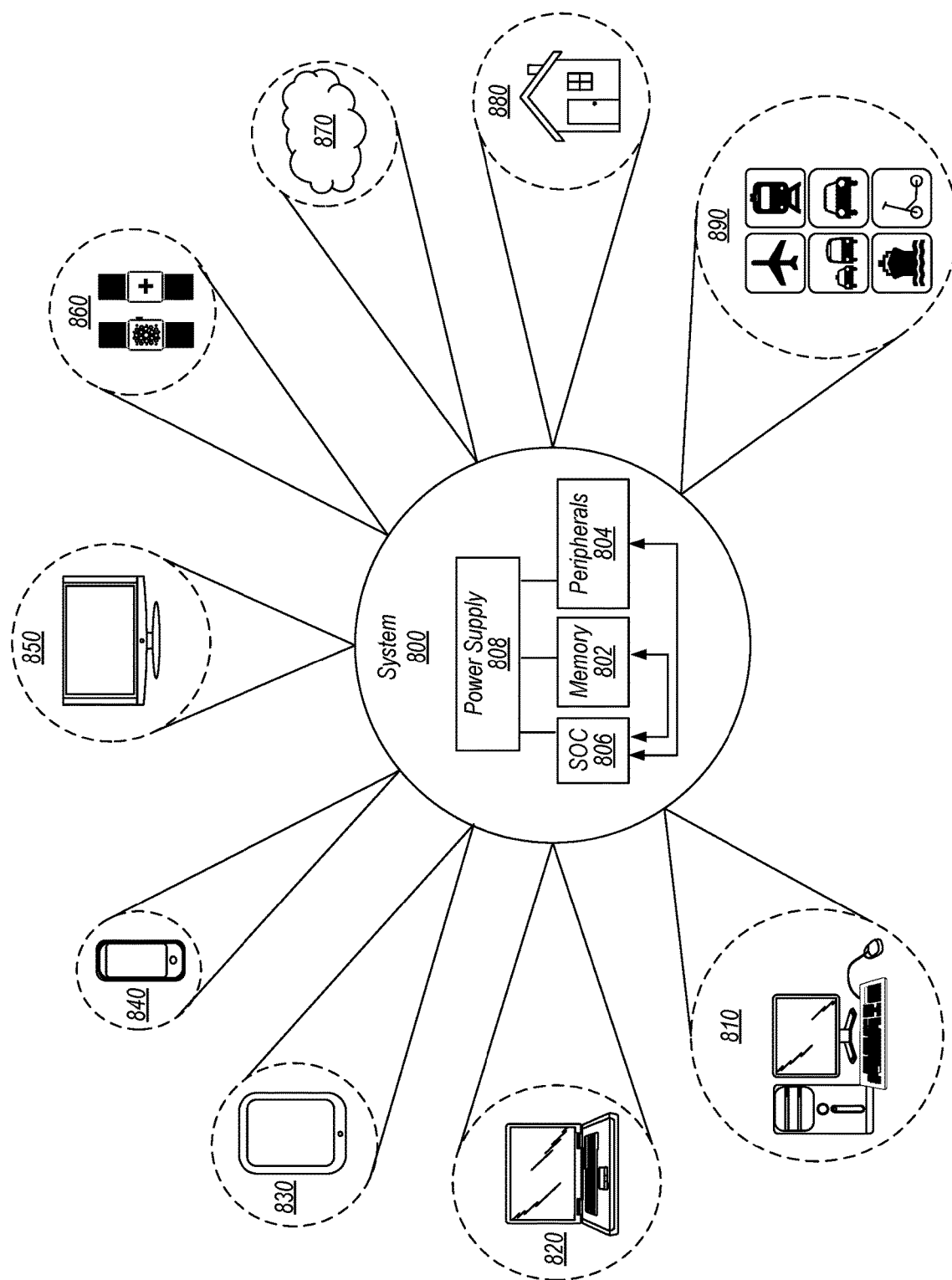
FIG. 8 is a block diagram of one embodiment of an example system.

Turning next to FIG. 8, a block diagram of one embodiment of a system 800 is shown that may incorporate and/or otherwise utilize the methods and mechanisms described herein. In the illustrated embodiment, the system 800 includes at least one instance of a system on chip (SoC) 806 which may include multiple types of processing units, such as a central processing unit (CPU), a graphics processing unit (GPU), or otherwise, a communication fabric, and interfaces to memories and input/output devices. In some embodiments, one or more processors in SoC 806 includes multiple execution lanes and an instruction issue queue. In various embodiments, SoC 806 is coupled to external memory 802, peripherals 804, and power supply 808.

A power supply 808 is also provided which supplies the supply voltages to SoC 806 as well as one or more supply voltages to the memory 802 and/or the peripherals 804. In various embodiments, power supply 808 represents a battery (e.g., a rechargeable battery in a smart phone, laptop or tablet computer, or other device). In some embodiments, more than one instance of SoC 806 is included (and more than one external memory 802 is included as well).

The memory 802 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

System 800 in the embodiment shown may include one or more implementations of a communications system, in SoC 806, peripheral 804, or both. Such communications system may implement various embodiments of the receiver as discussed above in reference to FIGS. 1-6 and that operate in accordance with the method illustrated in FIG. 7.

The peripherals 804 include any desired circuitry, depending on the type of system 800. For example, in one embodiment, peripherals 804 includes devices for various types of wireless communication, such as Wi-Fi, Bluetooth, cellular, global positioning system, etc. In some embodiments, the peripherals 804 also include additional storage, including RAM storage, solid state storage, or disk storage. The peripherals 804 include user interface devices such as a display screen, including touch display screens or multi-touch display screens, keyboard or other input devices, microphones, speakers, etc.

As illustrated, system 800 is shown to have application in a wide range of areas. For example, system 800 may be utilized as part of the chips, circuitry, components, etc., of a desktop computer 810, laptop computer 820, tablet computer 830, cellular or mobile phone 840, or television 850 (or set-top box coupled to a television). Also illustrated is a smartwatch and health monitoring device 860. In some embodiments, smartwatch 860 may include a variety of general-purpose computing related functions. For example, smartwatch 860 may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 800 may further be used as part of a cloud-based service(s) 870. For example, the previously mentioned devices, and/or other devices, may access computing resources in the cloud (i.e., remotely located hardware and/or software resources). Still further, system 800 may be utilized in one or more devices of a home 880 other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 8 is the application of system 800 to various modes of transportation 890. For example, system 800 may be used in the control and/or entertainment systems of aircraft, trains, buses, cars for hire, private automobiles, waterborne vessels from private boats to cruise liners, scooters (for rent or owned), and so on. In various cases, system 800 may be used to provide automated guidance (e.g., self-driving vehicles), general systems control, and otherwise. These any many other embodiments are possible and are contemplated. It is noted that the devices and applications illustrated in FIG. 8 are illustrative only and are not intended to be limiting. Other devices are possible and are contemplated.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may he described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function, For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus, comprising:
a front-end circuit configured to generate a filtered signal using a plurality of signals that encode a serial data stream that includes a plurality of data symbols;
a summing circuit configured to generate an equalized signal by combining the filtered signal and an analog feedback signal that is based on a digital feedback signal;
a first sampler circuit configured to sample the equalized signal during a first time period to generate a first regeneration signal;
a second sampler circuit configured to sample the equalized signal during a second time period to generate a second regeneration signal; and
a compensation circuit configured to generate the digital feedback signal using the first regeneration signal and the second regeneration signal;
wherein the first sampler circuit is further configured to cancel, during the first time period, first inter-symbol interference in the equalized signal using the second regeneration signal; and wherein the second sampler circuit is further configured to cancel, during the second time period, second inter-symbol interference in the equalized signal using the first regeneration signal.

2. The apparatus of claim 1, further comprising a plurality of sense amplifier circuits including a first most significant bit (MSB) sense amplifier and a first least significant bit (LSB) sense amplifier within the first sampler circuit and a second MSB sense amplifier and a second LSB sense amplifier within the second sampler circuit.

3. The apparatus of claim 2, wherein at least one of the plurality of sense amplifier circuits is configured to operate in a first mode in which received data symbols are ternary data symbols and further configured to operate in a second mode in which the received data symbols are binary data symbols.

4. The apparatus of claim 2, wherein at least one of the plurality of sense amplifier circuits includes:
   a first differential amplifier pair configured to generate a first compensation signal for a present data symbol;
   a second differential amplifier pair configured to generate a second compensation signal for the present data symbol;
   a threshold generation circuit coupled to receive the present data symbol and configured to generate a threshold voltage based on the first compensation signal and the second compensation signal; and
   a regeneration circuit configured to capture and store a logic value for the present data symbol based on the threshold voltage, and further configured to generate a corresponding portion of one of the first and second regeneration signals.

5. The apparatus of claim 4, wherein at least a first amplifier circuit is implemented using the first differential amplifier pair, wherein at least a second amplifier circuit is implemented using the second differential amplifier pair, and wherein the threshold generation circuit is implemented using a third differential amplifier pair.

6. The apparatus of claim 5, wherein the first amplifier circuit is configured to generate the first compensation signal based on an MSB value of a previously received data symbol, and wherein the second amplifier circuit is configured to generate the second compensation signal base on an LSB value of the previously received data symbol. to generate the second compensation signal base on an LSB value of the previously received data symbol.

7. The apparatus of claim 6, wherein the first amplifier circuit is configured to cause current to be subtracted from current associated with the present data symbol if a voltage of the previously received data symbol is greater than an MSB threshold voltage, and wherein the second amplifier circuit is configured to cause current to be added to current associated with the present data symbol if the voltage of the previously received data symbol is less than an LSB threshold voltage.

8. The apparatus of claim 5, further comprising a calibration circuit configured to:
   perform a first calibration of the first amplifier circuit;
   perform a second calibration of the second amplifier circuit; and
   perform a third calibration of the threshold generation circuit.

9. The apparatus of claim 1, further comprising a first digital-to-analog converter (DAC) configured to convert a most significant bit (MSB) of the digital feedback signal into a first portion of the analog feedback signal, and a second DAC configured to convert a least significant bit (LSB) of the digital feedback signal into a second portion of the analog feedback signal, wherein respective outputs of the first and second DACs is coupled to the summing circuit.

10. The apparatus of claim 1, wherein the first and second sampler circuits are configured to alternately sample the equalized signal over a plurality of consecutive time periods.

11. A method comprising:
   generating, using a front-end circuit, a filtered signal based on a plurality of signals that encode a serial data stream that includes a plurality of data symbols;
   combining, using a summing circuit, the filtered signal and an analog signal that is based on a digital feedback signal to generate an equalized signal;
   generating, using a first sampler circuit to sample the equalized signal during a first time period, a first regeneration signal;
   generating, using a second sampler circuit to sample the equalized signal during a second time period, a second regeneration signal;
   generating, using a compensation circuit, the digital feedback signal based on the first regeneration signal and the second regeneration signal;
   generating an analog feedback signal, using digital-to-analog converter (DAC) circuitry;
   canceling, using the first sampler circuit during the first time period, first inter-symbol interference in the equalized signal using the second regeneration signal; and
   canceling, using the second sampler circuit during the second time period, second inter-symbol interference in the equalized signal using the first regeneration signal.

12. The method of claim 11 further comprising:
   alternating sampling of the equalized signal between the first and second sampler circuits over a plurality of consecutive time periods.

13. The method of claim 11, further comprising generating the first and second regeneration signals in corresponding one of a plurality of sense amplifier circuits including a first most significant bit (MSB) sense amplifier and a first least significant bit (LSB) sense amplifier within the first sampler circuit and a second MSB sense amplifier and a second LSB sense amplifier within the second sampler circuit.

14. The method of claim 13, further comprising:
   generating, in a first differential amplifier pair, a first compensation signal for a present data symbol;
   generating, in a second differential amplifier pair, a second compensation signal for the present data symbol;
   generating, in a threshold voltage circuit, a threshold voltage based on the first and second compensation signals; and
   capturing and storing, in a regeneration circuit and based on the threshold voltage, a logic value for the present data symbol.

15. The method of claim 14, further comprising:
   performing a first calibration procedure to calibrate the first differential amplifier pair;
   performing a second calibration procedure to calibrate the second differential amplifier pair; and
   performing a third calibration procedure to calibrate the threshold voltage circuit.

16. The method of claim 13, further comprising:
   operating one of the plurality of sense amplifier circuits in a first mode in which received symbols are ternary data symbols; and
   operating one of the plurality of sense amplifier circuits in a second mode in which the received data symbols are binary data symbols.

17. A system comprising:
- a first sampler circuit configured to sample an equalized data signal and further configured to generate a first regenerated data signal;
- a second sampler circuit configured to sample the equalized data signal and further configured to generate a second regenerated data signal, wherein the first and second samplers are configured to alternately sample the equalized data signal over consecutive time periods;
- a feedback circuit configured to generate a digital feedback signal based on the first and second regenerated data signals; and
- a summing circuit configured to generate the equalized data signal based on a filtered signal and an analog feedback signal generated based on the digital feedback signal wherein the filtered signal is generated by a front-end circuit based on a plurality of signals that encode a serial data stream that includes a plurality of data symbols,
- wherein the first and second sampler circuits are configured to alternately cancel inter-symbol interference using the second and first regenerated data signals, respectively, during alternating time periods.

18. The system of claim 17, wherein at least one of the first and second sampler circuits comprises a plurality of sense amplifier circuits, wherein the first sampler circuit includes a first most significant bit (MSB) sense amplifier and a first least significant bit (LSB) sense amplifier and wherein the second sampler circuit includes a second MSB sense amplifier and a second LSB sense amplifier, wherein the first MSB sense amplifier and the first LSB sense amplifier are configured to generate the first regenerated data signal and wherein the second MSB sense amplifier and the second LSB sense amplifier are configured to generate the second regenerated signal.

19. The system of claim 18, wherein at least one of the plurality of sense amplifier circuits includes:
- a first differential amplifier pair configured to generate a first compensation signal for a present data symbol;
- a second differential amplifier pair configured to generate a second compensation signal for the present data symbol;
- a threshold generation circuit coupled to receive the present data symbol and configured to generate a threshold voltage based on the first compensation signal and the second compensation signal; and
- a regeneration circuit configured to capture and store a logic value for the present data symbol based on the threshold voltage, and further configured to generate a corresponding portion of one of the first and second regeneration signals.

20. The system of claim 18, wherein at least one of the plurality of sense amplifier circuits is configured to operate in a first mode in which received data symbols are ternary data symbols and further configured to operate in a second mode in which the received data symbols are binary data.

* * * * *

UNITED STATES PATENT AND TRADEMARK OFFICE
CERTIFICATE OF CORRECTION

PATENT NO. : 11,770,274 B1
APPLICATION NO. : 17/664747
DATED : September 26, 2023
INVENTOR(S) : Wing Liu et al.

Page 1 of 1

It is certified that error appears in the above-identified patent and that said Letters Patent is hereby corrected as shown below:

In the Claims

Column 17, Line 44, Claim 6, delete "symbol. to" and insert --symbol.--.

Column 17, Line 45-46, Claim 6, delete "generate the second compensation signal base on an LSB value of the prefiously received data symbol.".

Column 18, Line 3, Claim 9, delete "DA Cs" and insert --DAC--.

Column 18, Line 63, Claim 16, delete "received" and insert --received data--.

Column 19, Line 16, Claim 17, delete "signal wherein" and insert --signal, wherein--.

Signed and Sealed this
Thirtieth Day of January, 2024

Katherine Kelly Vidal
*Director of the United States Patent and Trademark Office*